(No Model.)  2 Sheets—Sheet 1.
C. P. STEINMETZ.
ALTERNATING CURRENT INDUCTION MOTOR.
No. 602,920.  Patented Apr. 26, 1898.
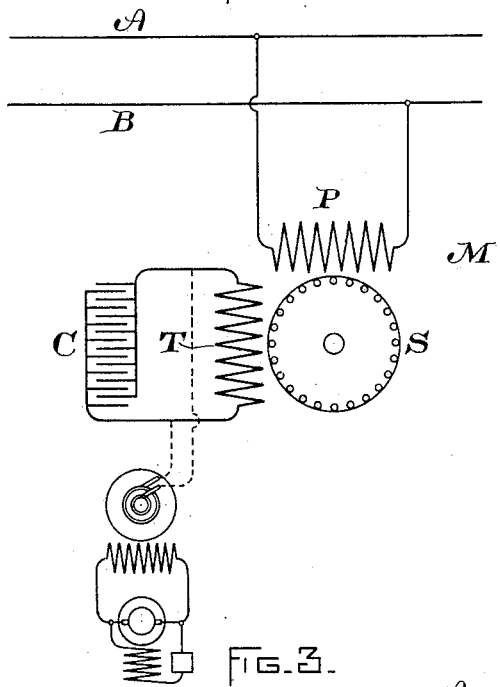
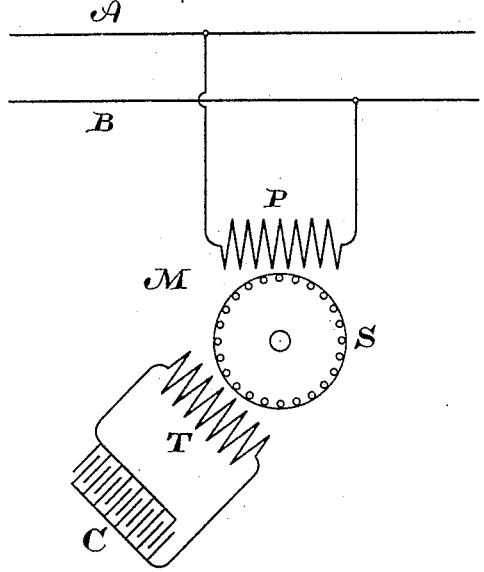
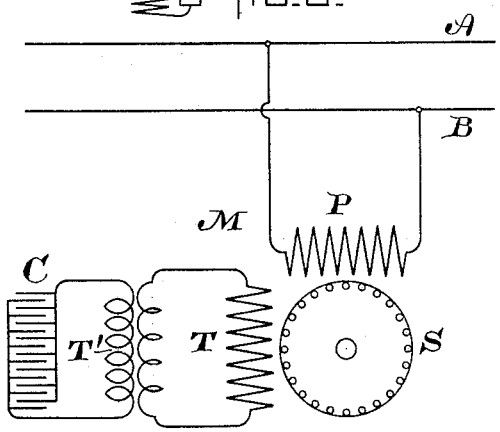
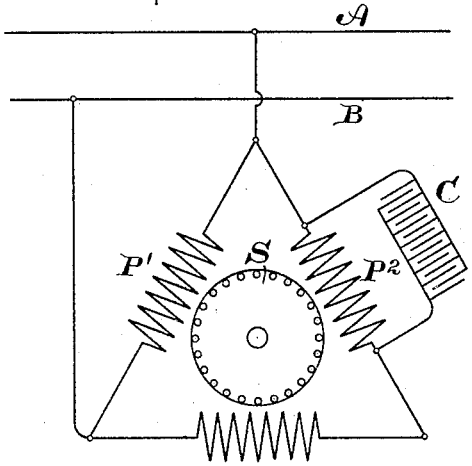
WITNESSES.
A. H. Abell.
B. B. Hull
INVENTOR.
Charles P. Steinmetz
By Geo. R. Blodgett
Atty

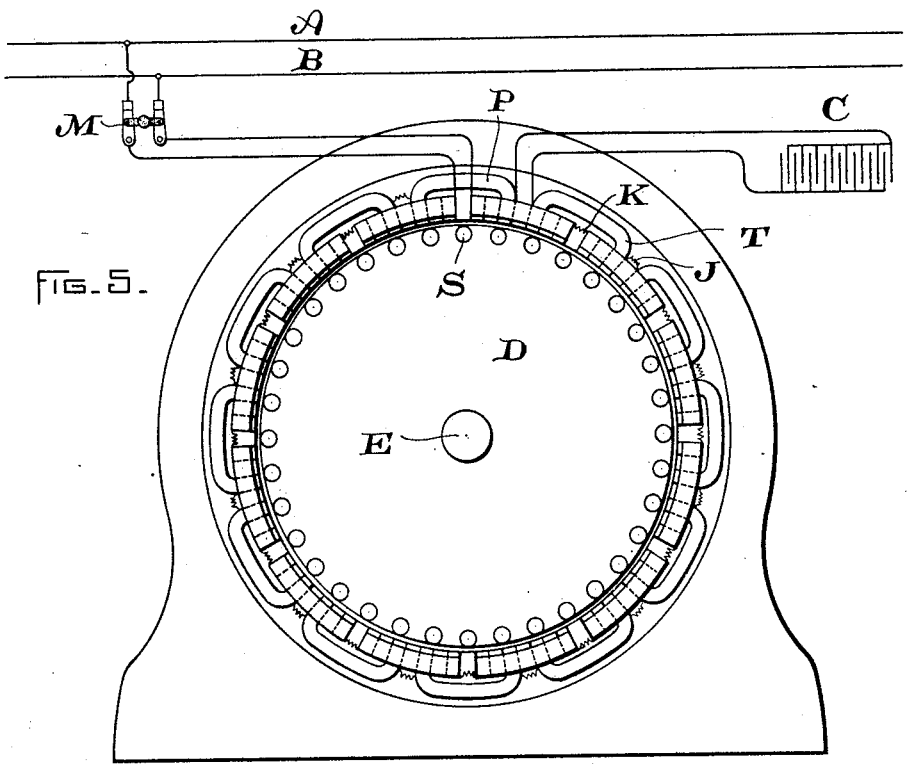
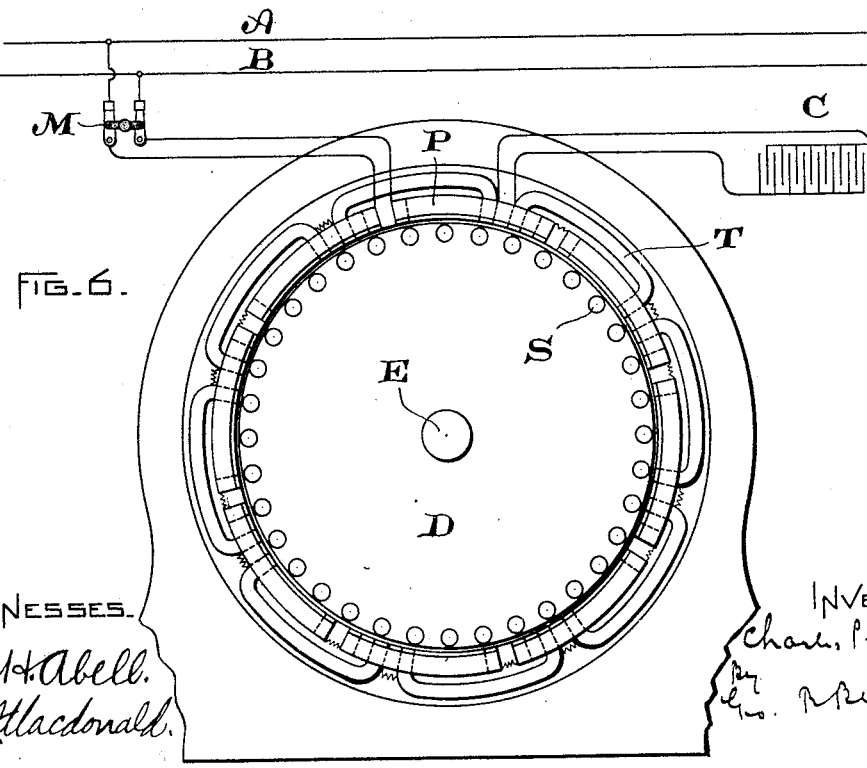

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ALTERNATING-CURRENT INDUCTION-MOTOR.

SPECIFICATION forming part of Letters Patent No. 602,920, dated April 26, 1898.

Application filed February 12, 1897. Serial No. 623,037. (No model.)

*To all whom it may concern:*

Be it known that I, CHARLES P. STEINMETZ, a citizen of the United States, residing at Schenectady, county of Schenectady, State of New York, have invented certain new and useful Improvements in Alternating-Current Induction-Motors, (Case No. 530,) of which the following is a specification.

By my present invention I aim to improve the operation of alternating-current induction-motors in various particulars, as will be hereinafter pointed out. Owing to the self-induction and magnetizing current in motors of this description the current is lagged behind the electromotive force in the motors, and unless compensated by a leading current of proper value this lag in the current extends to the lines leading from the generator and lessens the actual energy in the circuit as compared with the apparent energy, giving rise to a low-power factor.

Various arrangements have heretofore been proposed for compensating the lagging currents in the lines—as, for example, by shunting the induction-motor by a condenser or other source of capacity. These expedients are effective only to correct the current lag in that portion of the circuit external to the motor. They cannot compensate for lagging currents within the motor itself. Furthermore, condensers in shunt to alternating-current motors require a sine-wave electromotive force in order to effectively compensate for lagging current, and therefore condensers are not well adapted for use with a large majority of alternators now employed on single-phase systems which are designed so as to impress upon the circuit electromotive forces having peaked or distorted wave shapes.

One feature of my invention consists of an arrangement for compensating for lagging currents within the motor itself, as well as in the external circuit, so as to increase the power factor, output, and efficiency of the motor, and I find that I can secure this compensation in the manner herein described, not only on circuits carrying sine-waves, but also on circuits carrying electromotive forces of irregular wave shape, such as are in use at the present time. This result I accomplish, speaking in general terms, by producing leading currents in a closed circuit receiving induction from the secondary member of the motor or from both primary and secondary members, these leading currents having the proper values for compensating the self-induction and magnetizing current of the motor under a given condition of load. For example, I may make the compensation substantially perfect, so as to afford a power factor of one hundred per cent. at three-fourths load, while at other loads and above and below this amount the compensation may vary somewhat or the value of the leading current may be regulated.

The invention also has another highly-useful application in enabling induction-motors on single-phase circuits to start with considerable torque.

As is well-known, single-phase induction-motors ordinarily are not self-starting; but by arranging a tertiary closed circuit in which leading currents are maintained, as already suggested, in inductive relation to both the primary and secondary circuits of the motor, then the magnetisms due to the primary and tertiary circuits will be out of phase and will secure the two-phase effect desired for giving the motor starting torque. Furthermore, the same arrangement will also compensate for self-induction and magnetizing current of the motor, as heretofore explained, and in this way the efficiency, output, and power factor of single-phase motors, which to-day are less than in polyphase motors, can be increased a substantial amount, so that in these respects the single-phase motor becomes nearly equal and perhaps in some cases quite equal to the multiphase motor.

It has been proposed to introduce capacity into the circuit of the secondary member of an induction-motor by closing the secondary circuit through a condenser; but this is radically different from my invention. When a condenser is included in the secondary circuit, the frequency in the condenser-circuit varies with the speed of the motor, becoming greater at low speed and less at higher speeds. It is therefore necessary to adjust the capacity of the condenser for different speeds, and it is difficult to do this so as to secure satisfactory results.

By my invention the frequency in the tertiary circuit is entirely independent of the speed of the motor and always corresponds with the frequency of the primary circuit irrespective of changes of speed.

I regard as a novel and valuable result secured by my invention the fact that I am able to introduce leading currents into an induction-motor and to compensate for the harmful effects of self-induction in the secondary without exposing the condenser or other phase-advancing device to an electromotive force of varying frequency.

In this application I propose to set forth and claim the invention in its more generic aspects, and shall also make more specific claims to the arrangement of the tertiary circuit ninety degrees from the primary motor-circuit, so that it receives induction only through the secondary member of the motor, since this arrangement I find is especially well adapted to compensate for self-induction and lagging current in the motor, though it will not lend starting torque to a single-phase motor.

In another application of even date herewith, Serial No. 623,038, I make claims covering specifically an arrangement of the tertiary circuit such that it will give starting torque to a single-phase motor and when desired compensate for lagging currents in the motor.

In the accompanying drawings, Figures 1, 2, 3, 4, 5, and 6 are diagrams illustrating various applications of the invention and various combinations in which it may be embodied, as will be described hereinafter.

In Fig. 1, A B are the mains of a single-phase alternating circuit supplied either from a single-phase generator or from one branch of a polyphase machine. M represents an induction-motor having a primary coil connected across the mains A B, a secondary revolving member S, containing closed circuits wound in any customary manner, though I greatly prefer to use a secondary having a multiphase winding, such that the coefficient of mutual induction between the secondary winding and either of the other windings will be substantially constant at any position of the secondary. Such a secondary is shown in the drawings. T is a tertiary coil which is wound on the primary member of the motor ninety degrees displaced from the primary circuit P. This tertiary coil is closed through a condenser C. It will be seen that in this form the coefficient of mutual induction of the coils P and T when the secondary is at rest is, practically speaking, zero. As the secondary begins to revolve current is induced in the coil T of a frequency which increases directly with the speed of rotation of the secondary and also with the frequency of the current in said secondary; but the frequency of the current in the secondary varies inversely with the speed, so that the frequency of the current induced in the coil T is substantially constant. The condenser causes the current in the tertiary circuit to lead, and this in turn establishes a corresponding leading current in the secondary member and so also a corresponding leading current in the primary member, so that this arrangement compensates for lagging currents in the external circuit, thereby securing an effect similar to that of a condenser in shunt to the motor; but it also fulfils the very useful and different function of compensating for the self-induction and lagging magnetizing current of the motor itself. The capacity of the condenser will be adjusted to afford leading currents of proper value to perform the desired compensation under any given conditions. Instead of the condenser other means for causing the current to lead in the tertiary circuit may be employed—as, for example, an overexcited synchronous motor—though a condenser will ordinarily be used in practice. I show in Fig. 1 such a synchronous motor M′ connected, in dotted lines, to the tertiary circuit, which may act as a source of capacity instead of a condenser. The arrangement of the primary and tertiary circuits ninety degrees apart, as shown in this figure, will not give starting torque, for the reason that when the secondary is at rest the current induced therein by the primary P flows in such paths that it does not tend to induce current in the tertiary T. In other words, the coefficient of mutual induction between P and T is, practically speaking, zero when the motor is at rest, whether we consider direct mutual induction or indirect mutual induction through the secondary; but this form is peculiarly well adapted for compensating for lagging currents, since the tertiary receives no induction except through the secondary and does not have to assist in starting the motor, so that the capacity of the condenser C does not have to be adjusted.

I next show in Fig. 2 a somewhat different embodiment of the invention, which will give starting torque as well as compensate for lagging currents. This last arrangement will be included within the broader claims made in this case, though it will be claimed specifically in my separate application referred to as a different modification of the invention from that shown in Fig. 1.

In Fig. 2 the same parts are shown as in Fig. 1 and are identified by corresponding letters. The tertiary circuit, however, is arranged at an angle other than zero or ninety degrees from the primary circuit P, so that the tertiary circuit is in inductive relation both to the primary and secondary circuits of the motor. Hence currents will be induced in the tertiary circuit even though the motor be standing still and its currents will lead the currents in the primary circuit, so that the secondary member is magnetized with a two-phase effect and a starting torque secured.

In Fig. 3 I show the same parts as in Figs. 1 and 2, with the tertiary circuit T ninety degrees from the primary circuit P, connected to the condenser C through a step-up transformer T', giving higher voltages at the condenser-terminals than would otherwise be practicable. It many cases it will be desirable to use such a step-up transformer, both in this and other combinations embodying my invention.

In Fig. 4 I show how the invention can be applied to motors of existing types wound for polyphase circuits, but running on single-phase circuits. Here A B represent the mains of a single-phase circuit, and P' P$^2$ P$^3$ the primary coils of a delta-wound alternating motor. The secondary of the motor has any ordinary closed-circuit winding. The coil P' is connected across the mains A B, and the coil P$^2$, sixty degrees displaced from P', is closed through the condenser C. The operation of this form of the invention will be understood.

Fig. 5 is a general view of a large motor constructed in accordance with the diagram shown in Fig. 1. A B are the mains, connected through the switch M to the primary windings P. These windings consist of a plurality of coils connected together by the wires K, as is well understood in the art. The tertiary windings T are arranged in the same manner and connected together by the wires J and closed on the phase-advancing device C. D is the secondary revolving on the shaft E, wound with the closed windings S of any preferred character, though I prefer to use a multiphase winding, as above set forth.

Fig. 6 is a corresponding view of the form shown in Fig. 2 and will be readily understood.

When I speak of an angle of ninety degrees in this specification and in the claims thereto attached, it will be evident to those skilled in the art that I refer to an angular distance of one-fourth of the distance from one north pole to the next north pole in the same phase.

What I claim, and desire to secure by Letters Patent of the United States, is—

1. The method of compensating for the self-induction and magnetizing current of an alternating-current motor, which consist in inducing from the secondary of the motor leading currents in a tertiary closed circuit in inductive relation to the secondary member.

2. The method of compensating for the self-induction and magnetizing current of an alternating-current induction-motor, which consists in balancing the lagging currents in the primary and secondary members by leading currents in a closed circuit in inductive relation to the secondary member, as described.

3. The combination of an alternating-current induction-motor, having primary and secondary circuits, with a tertiary circuit on the primary member, and means for causing the currents in the tertiary circuit to lead the electromotive force, as described.

4. The combination with the primary and secondary members of an induction-motor of a tertiary circuit receiving induced currents through the secondary of the motor and a condenser in the tertiary circuit, as set forth.

5. The combination of an alternating-current induction-motor having a primary winding connected or adapted to be connected across the mains of a single-phase circuit, a closed-circuit secondary member, a tertiary coil in inductive relation to the primary through the secondary member during the normal operation of the motor, and a phase-advancing device in the circuit of the tertiary coil, as set forth.

6. The combination with an induced winding of an alternating-current induction-motor, of a source of leading currents of a frequency independent of the speed of the motor, so connected to said induced winding as to compensate for the lagging current throughout the motor, substantially as described.

7. The combination of an alternating-current induction-motor and a tertiary closed circuit in inductive relation to the primary through the secondary member of the motor, during the normal operation of the machine, with a source of leading currents in the tertiary circuit, whose frequency corresponds to the frequency in the primary of the motor, and is independent of the speed of the secondary member, as set forth.

8. The combination in an alternating-current induction-motor having primary and secondary circuits, of a tertiary closed circuit arranged on the primary member of the motor at an angle of ninety degrees from the primary winding, a multiphase secondary, and a source of leading currents in the tertiary circuit.

9. In an alternating-current induction-motor, the combination of a source of leading currents of a frequency independent of the speed of the motor and an inductive connection between the motor-windings and the source of leading currents, the value of the leading current being so proportioned as to compensate not only for lag in the external circuit, but also for lag in the motor itself.

10. The combination with the two members of an alternating-current induction-motor and their circuits, of a tertiary circuit receiving current by induction from one member of the motor through the other member, and a source of leading current in the tertiary circuit.

11. The combination with the primary and secondary circuits of an alternating-current induction-motor, of a tertiary circuit on the primary member in inductive relation to the secondary member, and at an angle of ninety degrees from the primary circuit, and a condenser in the tertiary circuit, adjusted so as to compensate not only for lag in the external circuit, but also for lag due to the self-induction and magnetizing current of the motor.

12. The combination of an induction-motor having a winding connected across a single-phase circuit and supplied with current therefrom, a closed-circuit secondary member, a tertiary circuit closed upon a condenser, the capacity of which is proportioned so as to balance or substantially balance the self-induction and magnetizing current in the motor.

13. The combination of an induction-motor having primary and secondary windings, and a tertiary circuit in inductive relation to the primary through the secondary, with a source of leading currents, and a step-up transformer inductively closing the tertiary circuit through the said source, substantially as described.

14. The method of reducing the self-induction of an alternating-current motor which consists in generating leading currents in a tertiary winding, and reflecting back an advanced wave through the armature to the primary.

15. In an alternating-current motor the combination of a pair of single-phase mains, a field-winding fed therefrom, a secondary member, an additional field-winding receiving current by induction from said secondary, and a condenser in shunt to said additional winding.

16. The combination in an alternating-current motor of a primary winding, a relatively movable secondary winding, and a tertiary winding in inductive relation with the primary winding through the secondary during the normal operation of the motor, and a phase-advancing device in circuit with the tertiary winding.

17. The method of compensating for phase displacement in an induction-motor, which consists in generating, by the inductive action of the currents flowing in the induced member of the motor, an electromotive force in a tertiary circuit, and causing the current in said tertiary circuit to lead the electromotive force, and reflecting back an advanced wave through the secondary to the primary.

18. The method of compensating for phase displacement in an induction-motor, which consists in generating, by the inductive action of the currents flowing in the induced member of the motor, an electromotive force in a tertiary circuit, fixed with relation to the primary circuit of the motor, and causing the current in said tertiary circuit to lead the electromotive force, and reflecting back an advanced wave through the secondary to the primary.

19. The combination in an alternating-current motor of a primary winding, a relatively rotatable secondary winding, and a tertiary winding so arranged that the mutual induction between the said tertiary winding and the primary winding is small when the motor is at rest, and increases as the motor begins to move, and a source of leading current in the circuit with the tertiary winding.

20. The combination in an alternating-current motor of a primary, a tertiary, a phase-advancing device arranged to act upon the current in the tertiary, and a secondary capable of rotation with respect to the primary and tertiary, constructed in such a manner that the coefficient of mutual induction between the secondary and the primary or tertiary is substantially constant at all positions of the secondary.

21. The combination in an alternating-current motor of a primary, a tertiary so arranged that the coefficient of mutual induction between the primary and the tertiary is small when the motor is at rest, a phase-advancing device arranged to act upon the current in the tertiary, and a secondary capable of rotation with respect to the primary and tertiary, constructed in such a manner that the coefficient of mutual induction between the secondary and the primary or tertiary is substantially constant at all positions of the secondary.

In witness whereof I have hereunto set my hand this 27th day of January, 1897.

CHARLES P. STEINMETZ.

Witnesses:
B. B. HULL,
M. H. EMERSON.